United States Patent
Hahn et al.

Patent Number: 5,410,304
Date of Patent: Apr. 25, 1995

[54] METHOD AND APPARATUS FOR DISPLAYING THE IMPENDING DANGER DUE TO SPEED ASSOCIATED WITH THE DRIVING SITUATION OF A VEHICLE

[75] Inventors: Horst Hahn, Renningen; Wolfgang Lauer, Heilbronn; Siegfried Reiniger, Deizisau, all of Germany

[73] Assignee: Daimler-Benz AG, Stuttgart, Germany

[21] Appl. No.: 53,397

[22] Filed: Apr. 28, 1993

[30] Foreign Application Priority Data

May 5, 1992 [DE] Germany .................. 42 14 817.0

[51] Int. Cl.$^6$ .............................................. G08G 1/16
[52] U.S. Cl. .................................... 340/903; 340/435
[58] Field of Search ............... 340/903, 901, 436, 435; 342/70; 361/909

[56] References Cited

U.S. PATENT DOCUMENTS

3,892,483  7/1975  Säufferer .................. 340/903 X
5,285,187  2/1994  Hirao et al. .................. 340/436

FOREIGN PATENT DOCUMENTS

3637165   5/1988  Germany .
3810840  11/1989  Germany .
8814389.9  1/1990  Germany .
3941402   6/1991  Germany .

*Primary Examiner*—Jeffery A. Hofsass
*Attorney, Agent, or Firm*—Evenson, McKeown, Edwards & Lenahan

[57] ABSTRACT

A method for displaying the impending danger due to speed associated with the driving situation of a vehicle and a display appliance for carrying out the method are described. In accordance with the method, a degree of danger is defined and calculated and displayed to the driver of a vehicle and, in fact, independently of whether the vehicle, as following vehicle, is driving too close to a vehicle in front or other obstacle (distance problem) or is driving too fast in fog (visual range problem). The signals necessary for this purpose are obtained from vehicle environment sensors, for example from a distance warning radar or distance recording radar and an infrared visual range measuring system, and are analyzed, together with vehicle condition signals, by a safety computer. On the basis of its specific programming, this computer determines and/or decides, for the respective current driving condition, which of the two degrees of danger is instantaneously predominant and indicates the condition which is respectively more critical to safety on a display. The display, as an indicating appliance, is produced in such a way that it makes it possible to recognize, in symbolic proportion, both the degree of difference between the instantaneous speed and the speed which is currently still safe and the current measure of the danger or freedom from danger in the manner of an analog display which reproduces trends.

10 Claims, 1 Drawing Sheet

METHOD AND APPARATUS FOR DISPLAYING THE IMPENDING DANGER DUE TO SPEED ASSOCIATED WITH THE DRIVING SITUATION OF A VEHICLE

BACKGROUND AND SUMMARY OF THE INVENTION

The present invention relates to a method for displaying impending danger due to speed associated with the driving situation of a vehicle which is equipped with means for detecting a preceding vehicle in front and for recording the distance between the two vehicles and their speed relative to one another and which is also equipped with means for determining the current visual range.

With increasing traffic density, the increasing number of multiple collisions occurring between vehicles following one another (because of inadequate distance between them or excessive speed in poor visibility) emphasizes the requirement for a simple and reliable display of the impending danger associated with the driving situation of a vehicle. Up to now, there has been a lack of such a display which meets the specific perception requirements of mass traffic and which, therefore, satisfies an essential and fundamental precondition for a high level of acceptance in motorized traffic.

An object of the present invention is, therefore, to provide a method for displaying the impending danger due to speed associated with the driving situation of a vehicle and a display device for carrying out the method, which satisfy the previously mentioned precondition.

This and other objects are achieved by the present invention which provides a method for displaying the impending danger due to speed associated with a driving situation of a first vehicle which has a device that detects a second vehicle in front and measures a distance between the first and second vehicles and a speed of the first and second vehicles relative to one another and which also has a device that determines a current visual range. This method comprises the steps of recording the distance $a_m$ from the first vehicle to at least one of the second vehicle and an obstacle, the relative speed $V_{rel}$ between the first and second vehicles or between the first vehicle and an obstacle, the current visual range $a_{sw}$, a speed of the first vehicle $v_{eig}$, and a steering angle $\beta_L$ of the first vehicle. A safety distance between the first vehicle and the second vehicle is determined and a first difference $$\text{DELTA } a = (a_m - a_s)$$
$$= f(a_m, v_{rel}, v_{eig}, \tau, b, \beta_L)$$

where
$\tau$ = reaction time of a first vehicle driver
$b$ = deceleration of the first vehicle from $v_{eig}$
$\beta_L$ = steering angle is formed, where DELTA a is a measure with sign of the maintenance or non-maintenance of a non-dangerous following distance to the second vehicle or obstacle in front and the instantaneous speed $v_{eig}$ of the first vehicle, which can be increased or reduced. A maximum speed $v_{sw}$ which is still safe is determined as a function of the measured visual range $a_{sw}$ and a second difference $$\text{DELTA } v = (v_{eig} - v_{sw})$$
$$= f(a_{sw}, v_{eig}, \tau, b)$$

where
$\tau$ = reaction time of the first vehicle driver
$b$ = deceleration of the second vehicle from $v_{eig}$ is formed, where DELTA v is a measure with sign of an amount by which the speed of the first vehicle is less than or greater than a non-dangerous maximum speed of the first vehicle, which speed depends on the visual range $a_{sw}$. The smaller or more negative of the current values of DELTA a and DELTA v is then selected, the selected value being the value more critical to safety. The selected current value is used for triggering and emitting a danger distance and impending danger display in such a way that this display indicates, in symbolic proportion, a degree of difference between both: the instantaneous speed of the first vehicle and a first vehicle speed which is currently still safe; and a current measure of danger or freedom from danger.

The objects are also achieved by an embodiment of the present invention which provides a display apparatus for displaying the impending danger due to speed associated with a driving situation of a first vehicle which has a device that detects a second vehicle in front and measures a distance between the first and second vehicles and a speed of the first and second vehicles relative to one another and which also has a device that determines a current visual range. The display device comprises a range scale which extends from an adequate, positive value to a dangerously small, negative value representing DELTA values of at least one of the differences between a measured driving condition and an instantaneously still safe driving condition, and a measured driving speed and an instantaneously still safe driving speed. This range scale has the shape of a threshold bar comprising two triangular areas touching at their apexes at a common contact point and rotated by 180 degrees relative to one another. A display symbol in the form of a mark is provided that is deflectable over the range scale as a function of a currently selected DELTA value. The common contact point of the triangular areas symbolizes the speed at which the vehicle can still be driven safely.

The method according to the invention is based on the fundamental idea of continuously defining, determining and calculating a degree of danger and displaying it to the driver of the vehicle and, in fact, independently of whether the driver is driving his vehicle as the following vehicle too close to the vehicle in front or to some other obstacle (distance problem) or is driving too fast in fog (visual range problem).

The signals necessary for this purpose are obtained from vehicle environment sensors, for example from a distance warning radar or distance recording radar and an infrared visual range measuring system, and are analyzed, together with vehicle condition signals, by a safety computer. On the basis of its specific programming, this computer determines and/or decides, for the respective current driving condition, which degree of danger is instantaneously predominant and indicates the respectively most dangerous condition on a display. In addition to this, cognitive information on the remoteness or nearness of a state of danger takes place by means of a continuous analog or quasi-analog display, which therefore reproduces the trends.

In particular, the distance $a_m$ to the vehicle in front or the obstacle and the relevant relative velocity $v_{rel}$ are determined by a radar sensor, a representative value for the instantaneous visual range $a_{sw}$ is determined by an infrared visual range measurement system, the vehicle's own speed $v_{eig}$ is determined by a vehicle speed pick-up and the steering angle $\beta_L$ is determined by a steering angle pick-up. From these values, a "difference from the safety distance" DELTA a, which is relevant to proximity, is determined as a function of the instantaneous distance $a_m$, the vehicle's own speed $v_{eig}$, the reaction time $\tau$ of the vehicle driver, the deceleration b of the vehicle and the steering angle $\beta_L$. A "difference from the speed which is still safe" DELTA v, which is relevant to the visual range, is determined as a function of the visual range $a_{sw}$ as determined, the vehicle's own speed $v_{eig}$, the reaction time $\tau$ of the vehicle driver and the deceleration b of the vehicle.

In a following step, the respectively smaller difference, i.e. the more critical one in terms of safety, is selected automatically from these two values without the knowledge of or action by the vehicle driver and supplied to the vehicle driver, in a further step, in a display.

In this, it is important that the vehicle driver should have no knowledge of whether the instantaneous display is the result of a distance analysis or a visual range measurement and analysis. The driver is therefore only informed of the extent of the instantaneous danger or lack of danger in his driving situation so that, by matching or reducing the speed, he can, in each of the two cases, bring the distance from danger, and the safety, to the necessary amount or he can increase it.

The display device, according to the invention, for carrying out the method has a display symbol in the form of a deflectable indicator or mark in any shape whatsoever (for example in the shape of a colored or illuminated bar, etc.), which symbol can be deflected over a range scale extending from an adequate, and to this extent positive, difference DELTA to one which is excessively, therefore dangerously small, and to this extent negative, relative to the speed which can still be instantaneously considered as just non-dangerous. The scale can be, for example, a very simple shape of two triangular areas touching at the apex and rotated by 180°, the contact point of the two areas marking the position of the display symbol for the non-dangerous maximum speed of the vehicle. These areas are preferably laid out with different signal colors in such a way that the display symbol is present or moves, when the non-dangerous maximum drivable speed is still not being used fully, in the region of a green triangular area, for example, and, in the case of an excessively high speed, and therefore one involving danger, it is present or moves in the region of a red triangular area.

Other objects, advantages and novel features of the present invention will become apparent from the following detailed description of the invention when considered in conjunction with the accompanying drawings.

DETAILED DESCRIPTION OF THE DRAWINGS

Figure 1:
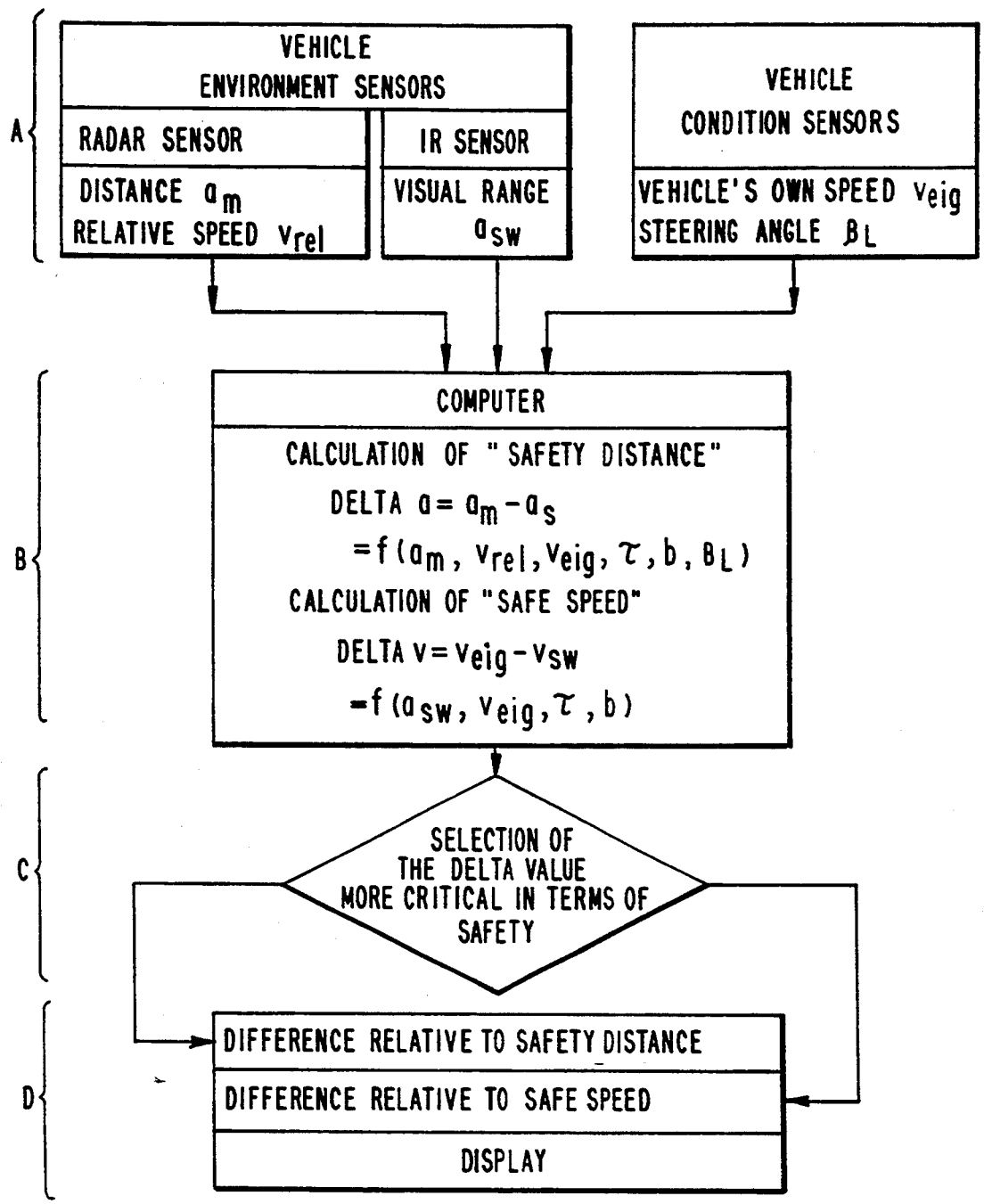
FIG. 1 shows a flow diagram of the method according to the an embodiment of invention.

As shown in FIG. 1, a first method step A obtains the following parameters by a conventional radar unit:

$a_m$ = measured distance to a vehicle in front or an obstacle $v_{rel}$ = measured relative speed between the following vehicle and a vehicle in front or an obstacle;

and the following parameter by a conventional infrared visual range measuring device, $a_{sw}$ = measured visual range These parameters will be referred to as "vehicle environment parameters".

In step A, it is also recorded from a speed conventional pick-up End a conventional steering angle pick-up, the parameters:

$v_{eig}$ = vehicle's own speed $\beta_L$ = steering angle and makes these parameters available. These parameters will be referred to as "vehicle condition parameters".

In a second step B, the safety distance as between the following vehicle and the vehicle in front or the obstacle in front are calculated in a conventional computer (hereinafter referred to as the "safety computer") and a first difference $$\text{DELTA } a = (a_m - a_s)$$
$$= f(a_m, v_{rel}, v_{eig}, \tau, b, \beta_L)$$

where $\tau$ = reaction time of the vehicle driver b = deceleration of the vehicle from $v_{eig}$ $\beta_L$ = steering angle is formed. DELTA a is, to this extent, a measure (with sign) of the maintenance or non-maintenance of a non-dangerous following distance to a vehicle or obstacle in front and an instantaneous speed $v_{eig}$ of the vehicle, which can possibly be increased or should be reduced. In step B, a speed $v_{sw}$ at which the vehicle can still be driven safely, is calculated as a function of the measured visual range $a_{sw}$ and a second difference $$\text{DELTA } v = (v_{eig} - v_{sw})$$
$$= f(a_{sw}, v_{eig}, \tau, b)$$

where $\tau$ = reaction time of the vehicle driver b = deceleration of the vehicle is formed. DELTA v is a measure (with sign) of the amount by which the speed of the vehicle is less than or greater than the speed of the vehicle which is still non-dangerous or can be driven safely, this speed depending on the visual range.

The following equations are exemplary of how DELTA a and DELTA v are calculated.

DELTA $a = a_s - a_m$, where $$a_s = -\frac{1}{2b_1} \cdot v_1^2 + \frac{1}{2b_2} \cdot v_2^2 + v_2 \cdot \tau$$

$$a_s = -\frac{1}{2b_1} \cdot (v_2 - v_{21})^2 + \frac{1}{2b_2} \cdot v_2^2 + v_2 \cdot \tau$$

The value $a_m$ is the measured distance between the vehicle in front, vehicle 1, and the following vehicle, vehicle 2. The subscripts in the equations identify the vehicle for while the parameter is relevant.

For DELTA v, the stopping distance "a" is first calculated as follows:

$$a = \frac{1}{2b} \cdot v^2 + v \cdot \tau,$$

wherein $\frac{1}{2b} \cdot v^2$ = braking distance and $v \cdot \tau$ = reaction distance.

With the viewing distance=the stopping distance, v is resolved according to the equation $$v = \frac{-\tau + \sqrt{\tau^2 + \frac{2a}{b}}}{\frac{1}{b}}$$

In a third step C, the value currently more critical to safety of the two current values DELTA a and DELTA v, i.e. the smaller or more negative value, is automatically selected.

In a fourth step D, this selected value (DELTA a or DELTA v) is used for triggering and emitting a danger distance display and impending danger display in such a way that this display makes it possible to recognize, in symbolic proportion, both the degree of difference between the instantaneous speed and the speed which is currently still safe and the current measure of the danger or freedom from danger.

The value $\tau$, the reaction time of the vehicle driver, is obtained as a fixed average value from a table of values, which are normalized statistical values. These normalized statistical values reflect practical differences of respective average values between different persons, for example persons of different age. Normally $\tau$ is selected to be equal to 1.0 second. The value b, the normally obtainable deceleration of the vehicle, is obtained as a fixed average value from a table of normal decelerations which may reflect difference in deceleration depending on the type of car, for example, in view of weight distribution on the axles. Normally b is selected to be equal to 6.5 m/s².

Figure 2:
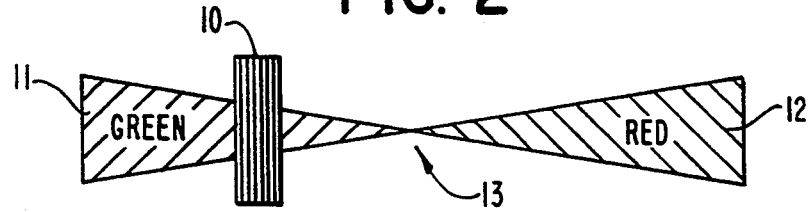
FIG. 2 shows a diagrammatic representation of a display device according to an embodiment of the present invention.

FIG. 2 explains a preferred configuration of a display device for carrying out the present invention.

The display device has a display symbol in the form of a deflectable mark 10 of any given realizable form. The mark 10 can be a conventional indicator, a liquid crystal mask or a liquid crystal symbol, an illuminated area with constant or variable illumination color, or one of a plurality of light-outlet windows or zones, which follow one another in series and which can be subjected to light from a plurality of triggerable light emitters (e.g. LEDs), in order to present, for example, an illuminated or colored bar, etc.

This mark can be deflected over a range scale, which extends from a generously adequate (and to this extent positive) to an excessively, therefore dangerously, small (and to this extent negative) difference DELTA a, v relative to the driving condition which can still be instantaneously considered as nondangerous. The range scale preferably has the very simple form of a threshold bar in the form of two triangular areas 11 and 12 touching at the apex and rotated by 180° relative to one another, the contact point of the same symbolizing the position 13 of the display mark 10 at a vehicle speed which can still be driven safely.

The arrow-shaped oppositely pointing areas 11 and 12 of the threshold bar are preferably designed with different signal colors so that the mark 10 is present or moves in the region of the left-hand area 11, made for example green, when the safely drivable speed is not fully used and is present or moves in the region of the right-hand and for example red, area 12 at a speed which can no longer be driven safely and which, to this extent, is too high.

The respectively increasing width of the threshold bar from the center towards the outside is an adequate, and cognitively easily convertible, measure for the vehicle driver of remote danger or impending danger, depending on the width of the threshold bar which is cut or marked by the mark 10. At the same time, the amount of the left-hand or right-hand deviation of the mark 10 relative to the neutral position 13, corresponding to the speed which can still be driven safely indicates the possibility of and the degree to which the instantaneous speed can be increased or indicates the necessary reduction. As already mentioned, without indicating whether it is the environment or condition parameters that are instantaneously more critical to safety, the display takes place instantaneously on the basis of an analysis of the following distance relative to a vehicle in front or an obstacle or on the basis of an analysis of the visual range.

The display can be refined by the mark 10 taking on the color of the left-hand scale area 11 when over it and taking on the color of the right-hand scale area 12 when over the latter and/or, on excessive deflection towards the right (for example beyond an alarm limit) in the region of a scale area 12 symbolizing a driving situation with impending danger, by the mark beginning to blink or flash.

The present invention further includes the light of an automatically illuminating mark assuming a special signal color when it pulses, this color differing from the light color in the case of continuous illumination of the mark.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Method for displaying the impending danger due to speed associated with a driving situation of a first vehicle which has a device that detects a second vehicle in front and measures a distance between the first and second vehicles and a speed of the first and second vehicles relative to one another and which also has a device that determines a current visual range, the method comprising the steps:

recording the distance $a_m$ from the first vehicle to the second vehicle, the relative speed $v_{rel}$ between the first and second vehicles, the current visual range $a_{sw}$, a speed of the first vehicle $v_{eig}$, and a steering angle $\beta_L$ of the first vehicle;

determining a safety distance between the first vehicle and the second vehicle and forming a first difference $$\text{DELTA } a = (a_m - a_s)$$
$$= f(a_m, v_{rel}, v_{eig}, \tau, b, \beta_L)$$

where
- $\tau$ = reaction time of a first vehicle driver
- b = deceleration of the first vehicle from $v_{eig}$
- $\beta$ = steering angle where DELTA a is a negative or positive measure of the maintenance or non-maintenance of a non-dangerous following distance to the second vehicle and the instantaneous speed $v_{eig}$ of the first vehicle, which can be increased or decreased;

determining a maximum speed $v_{sw}$ which is still safe as a function of the measured visual range $a_{sw}$ and forming a second difference $$\text{DELTA } v = (v_{eig} - v_{sw})$$
$$= f(a_{sw}, v_{eig}, \tau, b)$$

where
- $\tau$ = reaction time of the first vehicle driver
- b = deceleration of the second vehicle from $v_{eig}$ where DELTA v is a negative or positive measure of an amount by which the speed of the first vehicle is less than or greater than a non-dangerous maximum speed of the first vehicle, which speed depends on the visual range $a_{sw}$;

selecting the smaller or more negative of the current values of DELTA a and DELTA v, the selected value being the value more critical to safety;

using the selected current value for triggering and emitting a danger distance and impending danger display in such a way that said display indicates, in symbolic proportion, a degree of difference between both: the instantaneous speed of the first vehicle and a first vehicle speed which is currently still safe; and a current measure of danger or freedom from danger.

2. A display apparatus for displaying the impending danger due to speed associated with a driving situation of a first vehicle which has a device that detects a second vehicle in front and measures a distance between the first and second vehicles and a speed of the first and second vehicles relative to one another and which also has a device that determines a current visual range, the display device comprising:

a range scale which extends from an adequate, positive value to a dangerously small, negative value representing DELTA values of at least one of the differences between a measured driving condition and an instantaneously still safe driving condition, and a measured driving speed and an instantaneously still safe driving speed, which range scale has the shape of a threshold bar comprising two triangular areas touching at their apexes at a common contact point which is rotated by 180 degrees relative to one another; and a display symbol in the form of a mark that is deflectable over the range scale as a function of a currently selected DELTA value;

wherein the common contact point of the triangular areas symbolizes the speed at which the vehicle can still be driven safely.

3. Display device according to claim 2, wherein the mark is at least one of an illuminated indicator, a liquid crystal mask, a liquid crystal symbol, an illuminated area and one of a plurality of light outlet windows or zones which follow one another in series and which can be subjected to light from a plurality of triggerable light emitters.

4. Display device according to claim 2, wherein the mark is an illuminated area with a constant illumination color.

5. Display device according to claim 2, wherein the triangular areas of the range scale have different signal colors such that the mark is present and moves in scale ranges of different signal colors respectively when: the safely drivable speed is not being fully used; and the drivable speed is no longer safe.

6. Display device according to claim 5, wherein the mark assumes the color of the triangular range on which the mark is instantaneously located or on which the mark moves.

7. Display device according to claim 2, wherein the mark is an illuminated mark which normally has a constant brightness and which intermittently illuminates in the event of an excessive deflection into a scale range symbolizing an excessively high speed.

8. Display device according to claim 7, wherein during intermittent illumination of the mark, the illuminated color assumes a color which is different from that for continuous illumination.

9. Display device according to claim 2, wherein the mark is an illuminated area with a variable illumination color.

10. Method for displaying the impending danger due to speed associated with a driving situation of a vehicle which has a device that detects an obstacle in front and measures a distance between the vehicle and the obstacle and a speed of the vehicle relative to the obstacle and which also has a device that determines a current visual range, the method comprising the steps:

recording the distance $a_m$ from the vehicle to the obstacle, the relative speed $v_{rel}$ between the vehicle and the obstacle, the current visual range $a_{sw}$, a speed of the vehicle $v_{eig}$, and a steering angle $\beta_L$ of the vehicle; determining a safety distance between the vehicle and the obstacle and forming a difference $$\text{DELTA } a = (a_m - a_s)$$
$$= f(a_m, v_{rel}, v_{eig}, \tau, b, \beta_L)$$

where
- $\tau$ = reaction time of a vehicle driver
- b = deceleration of the vehicle from $v_{eig}$
- $\beta_L$ = steering angle where DELTA a is a negative or positive measure of the maintenance or non-maintenance of a non-dangerous following distance to the obstacle and the instantaneous speed $v_{eig}$ of the vehicle, which can be increased or decreased;

determining a maximum speed $v_{sw}$ which is still safe as a function of the measured visual range $a_{sw}$ and forming a second difference $$\begin{aligned} \text{DELTA } v &= (v_{eig} - v_{sw}) \\ &= f(a_{sw}, v_{eig}, \tau, b) \end{aligned}$$

where $\tau$ = reaction time of the vehicle driver b = deceleration of the obstacle from $v_{eig}$ where DELTA v is a negative or positive measure of an amount by which the speed of the vehicle is less than or greater than a non-dangerous maximum speed of the vehicle, which speed depends on the visual range $a_{sw}$;

selecting the smaller or more negative of the current values of DELTA a and DELTA v, the selected value being the value more critical to safety;

using the selected current value for triggering and emitting a danger distance and impending danger display in such a way that said display indicates, in symbolic proportion, a degree of difference between both: the instantaneous speed of the vehicle and a vehicle speed which is currently still safe; and a current measure of danger or freedom from danger.

* * * * *